(12) United States Patent
Krieger et al.

(10) Patent No.: US 10,243,887 B2
(45) Date of Patent: Mar. 26, 2019

(54) SWITCH UNIT, ETHERNET NETWORK, AND METHOD FOR ACTIVATING COMPONENTS IN AN ETHERNET NETWORK

(71) Applicant: Volkswagen Aktiengesellschaft, Wolfsburg (DE)

(72) Inventors: Olaf Krieger, Lostau (DE); Lothar Claus, Koenigslutter (DE); Christoph Hoffmann, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 67 days.

(21) Appl. No.: 15/437,652

(22) Filed: Feb. 21, 2017

(65) Prior Publication Data

US 2017/0187650 A1    Jun. 29, 2017

Related U.S. Application Data

(63) Continuation of application No. PCT/EP2015/066287, filed on Jul. 16, 2015.

(30) Foreign Application Priority Data

Aug. 19, 2014  (DE) .................. 10 2014 216 444

(51) Int. Cl.
*H04L 12/931*  (2013.01)
*H04L 12/12*  (2006.01)
(Continued)

(52) U.S. Cl.
CPC ............ *H04L 49/351* (2013.01); *G06F 13/14* (2013.01); *G06F 15/1735* (2013.01);
(Continued)

(58) Field of Classification Search
CPC ... H04L 49/351; G06F 13/14; G06F 15/17343
See application file for complete search history.

(56) References Cited

U.S. PATENT DOCUMENTS 6,134,665 A    10/2000  Klein et al.
7,681,051 B2    3/2010  Liu et al.
(Continued)

FOREIGN PATENT DOCUMENTS

DE    10 2008 022 101 A1    11/2009
DE    10 2009 047 864 A1    3/2011
(Continued)

*Primary Examiner* — Siming Liu
(74) *Attorney, Agent, or Firm* — Muncy, Geissler, Olds & Lowe, P.C.

(57) ABSTRACT

A switch unit for an Ethernet network having a switch and a microprocessor, the switch including at least three ports, which are connected to inputs and outputs of the switch unit, a signal detector and generator for detecting and initiating a bus activity being arranged in each case between the ports and the inputs and outputs of the switch unit. For each input and output an allocation rule to the other inputs and outputs of the switch unit is stored in a memory, the switch unit being designed such that when a bus activity is detected at a signal detector and generator, the assigned inputs and outputs of this input and output are read out from the memory and the associated signal detectors and generators are woken up so that they generate a bus activity at their inputs and outputs.

10 Claims, 2 Drawing Sheets

(51) Int. Cl.
*H04L 12/46* (2006.01)
*H04L 12/937* (2013.01)
*G06F 13/14* (2006.01)
*G06F 15/173* (2006.01)
*H04L 12/40* (2006.01)

(52) U.S. Cl.
CPC ........ *G06F 15/17343* (2013.01); *H04L 12/12* (2013.01); *H04L 12/40* (2013.01); *H04L 12/4625* (2013.01); *H04L 49/253* (2013.01); *G05B 2219/25012* (2013.01); *G05B 2219/25174* (2013.01); *Y02D 10/14* (2018.01); *Y02D 50/40* (2018.01); *Y02D 50/42* (2018.01)

(56) References Cited

U.S. PATENT DOCUMENTS

| | | |
|---|---|---|
| 7,711,970 B2 | 5/2010 | Keller |
| 8,095,667 B1 | 1/2012 | Karl |
| 9,210,227 B2 | 12/2015 | Diab |
| 9,413,549 B2 | 8/2016 | Balbierer et al. |
| 2010/0217965 A1 | 8/2010 | Wolff |
| 2013/0318380 A1 | 11/2013 | Behrens et al. |
| 2015/0131477 A1 | 5/2015 | Balbierer et al. |

FOREIGN PATENT DOCUMENTS

| | | |
|---|---|---|
| DE | 10 2010 008 818 A1 | 8/2011 |
| DE | 10 2012 207 858 A1 | 11/2013 |
| DE | 10 2013 221 803 A1 | 4/2014 |
| EP | 1 895 710 A2 | 3/2008 |
| JP | H11-88458 A | 3/1999 |
| JP | 2005-94162 A | 4/2005 |
| WO | WO 2004/036401 A2 | 4/2004 |

//

SWITCH UNIT, ETHERNET NETWORK, AND METHOD FOR ACTIVATING COMPONENTS IN AN ETHERNET NETWORK

This nonprovisional application is a continuation of International Application No. PCT/EP2015/066287, which was filed on Jul. 16, 2015, and which claims priority to German Patent Application No. 10 2014 216 444.3, which was filed in Germany on Aug. 19, 2014, and which are both herein incorporated by reference.

BACKGROUND OF THE INVENTION

Field of the Invention

The invention relates to a switch unit, an Ethernet network comprising a switch unit and a method for activating components in an Ethernet network.

Description of the Background Art

Ethernet networks have long been known from the field of computer science, and their use in motor vehicles has been contemplated in recent years. One advantage of Ethernet networks over conventional automotive networks, such as CAN or FlexRay, is that they very easily permit subnetwork operation, so that unnecessary control units may be switched off or placed in sleep mode. This makes it possible to correspondingly save electrical energy.

A method for activating at least one temporarily inactive network component of a network system for a motor vehicle is known from DE 10 2010 008 818 A1, which corresponds to U.S. Pat. No. 9,413,549, a central network device of the network system being connected to the network component via signals by a path within the network system. The path at least partially leads over a network segment of the network system, the network segment connecting, via signals, the network component and a first activation device assigned thereto to a switch device arranged in the path and to a second activation device assigned thereto in an unbranched manner. The central network device addresses the first activation device with the aid of the switch device by sending a network function control signal. The network system is preferably an Ethernet network. The disadvantage of central approaches of this type is that the failure of this central component results in the total failure of the network.

A method for activating deactivated control units of a vehicle in a vehicle network is known from DE 10 2012 207 858 A1, which corresponds to US 2015/0131477, in which the control units of the vehicle, which form the nodes of the vehicle network, are able to communicate with each other, a group of control units of the vehicle, which are to be activated and are in communication with each other, being combined into a subnetwork to be activated. Each node has at least one network interface to an adjacent node, which is directly addressable via this network interface, and also has a subnetwork management system. The subnetwork management system specifies the network interface via which the node of the vehicle network may communicate with which subnetwork; in the presence of an activation command for the control units of a subnetwork in the subnetwork management system, a node identifies which of its network interfaces it is able use to communicate with the subnetwork to be activated, the node subsequently transmitting the activation command to the adjacent nodes via the identified network interfaces. The adjacent node is then activated by transmitting the activation command if the node was deactivated prior to the transmission of the activation command. This type of communication setup may also be referred to as step-by-step wakeup. However, this method has the disadvantage that it is slow, depending on the number of control units or switch devices to be woken up. Interactive electrical systems usually are to respond without noticeable delay in the vehicle. However, it may take as long as 200 ms to set up a connection between two directly connected control units.

One possible solution to this time problem is a global wakeup. For this purpose, the switch units (or switch devices) may have hardware which ensures that, as soon as activity is detected on one link (before the communication is established), all other links are also woken up directly. As a result, all links in the vehicle start up almost simultaneously as soon as a control unit has a need for communication (i.e., after approximately 200 ms). As soon as all control units are awake and determine that they are, in fact, not needed, they may be shut down and turn themselves off, coordinated via the communication established up to that point. The shutdown may occur, for example, via a network management protocol. This is not an optimum approach from an energy perspective.

SUMMARY OF THE INVENTION

It is therefore an object of the invention to provide a switch unit and an Ethernet network as well as to make available a method for activating components in an Ethernet network, with the aid of which an energy-efficient and fast wakeup of sleeping control units and/or switch units is facilitated.

The switch unit for an Ethernet network comprises a switch and a microprocessor, the switch including at least three ports, which are connected to the inputs and outputs of the switch unit. A signal detector and generator for detecting and initiating a bus activity is arranged in each case between the ports and the inputs and outputs of the switch unit. The switch unit furthermore includes a memory unit; for each input and output, an allocation rule to the other inputs and outputs of the switch unit is stored in the memory unit, the switch unit being configured therein in such a way that, upon detecting a bus activity at a signal detector and generator, the inputs and outputs assigned to this input and output being read out from the memory unit, and the associated signal detectors and generators being woken up so that they themselves generate a bus activity at their inputs and outputs. The advantage is that the wakeup of the signal detectors and generators is significantly faster than the setup of the actual communication link between two control units, two switch units or a control unit and a switch unit. The switch unit therefore already wakes up the next component required (control unit or switch unit) before a communication link is even set up. This gains a significant amount of time compared to the step-by-step wakeup approach.

In an embodiment, the switch unit is designed in such a way that the memory unit may be configured by the microprocessor. As a result, in each case the switch unit may re-specify, prior to deactivation, which components are to be woken up based on an activity of one component. This facilitates great flexibility during the setup of data links.

In an embodiment, the signal detectors and generators and the memory unit are continuously supplied with voltage, so that the wakeup operation takes place very rapidly.

A voltage controller, on the other hand, is assigned to the switch and the microprocessor, which is designed in such a way that it is switched at least as a function of the signals at the signal detectors and generators. The voltage controller may be designed in such a way that it adjusts the voltage upward from a standby voltage to an operating voltage. However, the voltage controller may also be a switch which connects and disconnects the operating voltage.

The Ethernet network includes at least one switch unit of the type described above, which is connected to control units and/or additional switch units.

All switch units may be provided with a memory unit, in which the allocation rule is stored. However, it is also possible, depending on the network configuration, that individual switch units do not include a memory unit of this type and, for example, wait for a communication signal or wake up all connected control units and/or switch units. In addition, one switch unit may wake up all connected control units and/or switch units in a particular operating mode, despite having a memory unit, for example because the data link to be set up is time-critical.

In an embodiment, the switch units are designed in such a way that a step-by-step wakeup operation is carried out in another operating mode. This may be sensible, for example, if a completely new data link is to be set up, or if one of the memory units is incorrectly configured. However, this may result in a noticeable delay in the network.

The method for activating components in an Ethernet network comprises the method step that, based on a bus activity of a control unit setting up the data link in the at least one switch unit having a memory unit, this bus activity is detected with the aid of the signal detector and generator in the switch unit, and a bus activity at the assigned inputs and outputs is generated, so that the control units and/or switch units connected thereto are woken up, the microprocessor preferably being started up in parallel thereto.

The Ethernet network can be an automotive network, but it may also be used in any other environment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
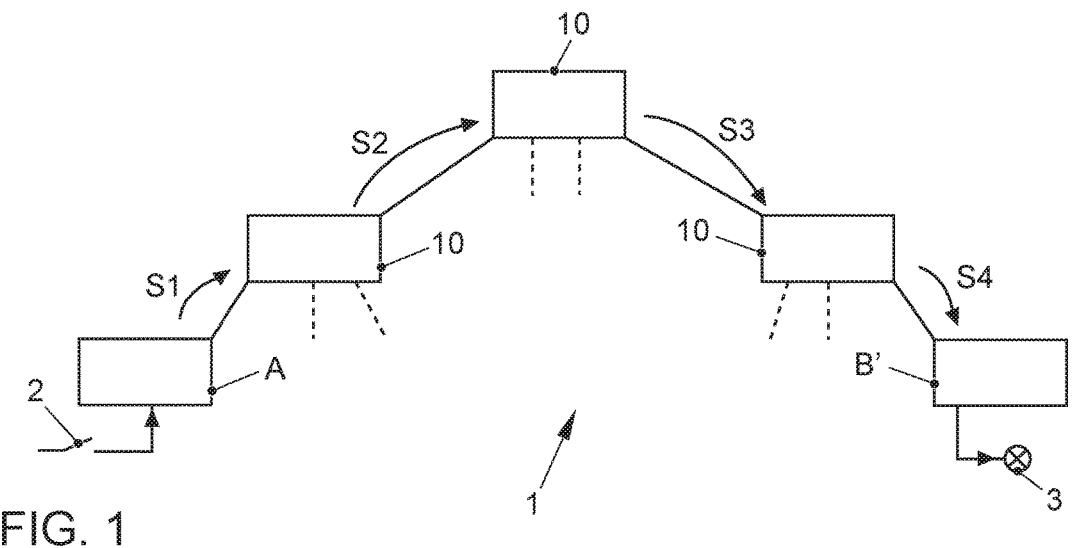
FIG. 1 shows a schematic block diagram of a part of an Ethernet network having a step-by-step wakeup operation.

Part of an Ethernet network 1 is illustrated in FIG. 1, which includes a first control unit A and a second control unit B', which are connected to each other via three switch units 10, the dashed line on switch units 10 being intended to show that the latter may be connected to additional control units and/or switch units. A switch or sensor 2 is assigned to control unit A, wherein an actuator 3 is to be activated by control unit B' upon the detection of a sensor signal or the actuation of the switch.

Assuming that all control units A, B' and all switch units 10 are asleep, control unit A is first woken up by sensor 2 or the switch. After control unit A is woken up, the latter transmits a communication signal to connected switch unit 10 in a first step S1 with the request to set up a data connection with control unit B'. At the address of control unit B', switch unit 10 now detects that superordinate switch unit 10 is required for the data connection and, in a second step S2, transmits another communication signal to this switch unit 10, which then transmits a communication signal to additional switch unit 10 in a third step S3, until the switch unit finally wakes up control unit B' via a communication signal in another step S4. Control unit B' may then activate actuator 3. Assuming that each step S1 through S4 takes approximately 200 ms, the data connection from A to B' requires approximately 800 ms. This wakeup operation is also referred to as step-by-step wakeup.

Figure 2:
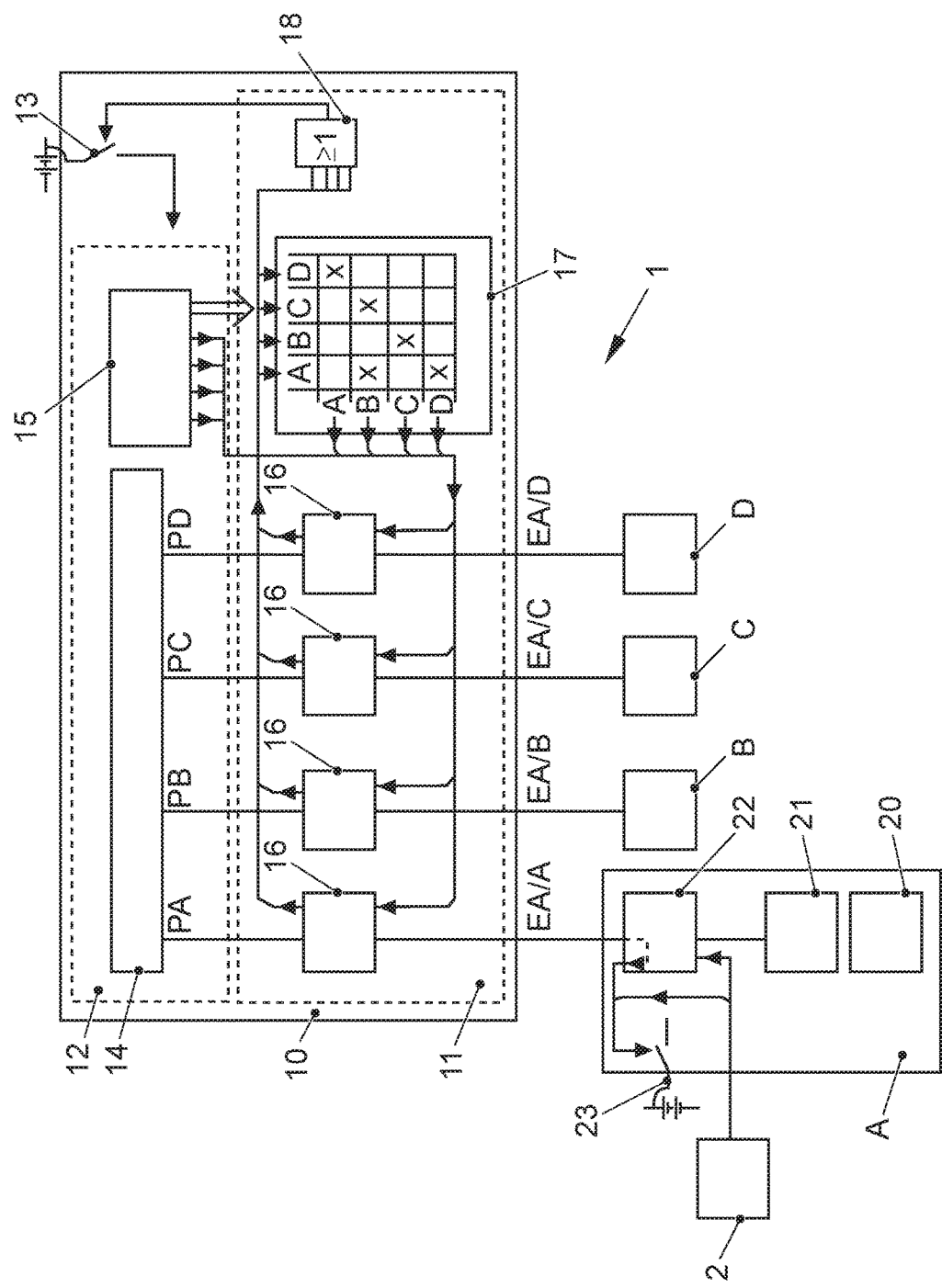
FIG. 2 shows a schematic block diagram of a part of an Ethernet network including a switch unit according to the invention.

FIG. 2 again shows part of an Ethernet network 1, including control unit A and a switch unit 10, illustrated switch unit 10 being connected to additional components B, C and D, B, C and D being able to be control units or switch units 10.

Switch unit 10 has a part 11, which is continuously supplied with voltage, and a part 12, whose voltage may be switched on and off via a switch 13. Second part 12 comprises a switch 14 having four ports PA through PD as well as a microprocessor 15. First part 11 includes four signal detectors and generators 16 for detecting and initiating a bus activity. Signal detector and generator 16 is made up of, for example, a transceiver, which reacts to a state change on the connected bus line and is itself able to generate valid signals. First part 11 furthermore includes a memory unit 17, which is designed as a non-volatile RAM, as well as an OR logic 18. Units 16 are situated between ports PA through PD and inputs and outputs EA/A through EA/D of switch unit 10. The designation inputs and outputs is intended to clarify that the connection is bidirectional, i.e., it is able to transmit and receive via the input and output. An allocation rule is stored in memory unit 17 which identifies the network participants to which an individual network participant would like to set up a data connection or via which a data connection must pass. For example, it shows that control unit A requires components B and D for a data connection. Accordingly, component B requires component C, etc.

Control unit A comprises a microprocessor 20, an Ethernet physical layer circuit 21 and a signal detector and generator 22, which is designed similarly to signal detectors and generators 16 in switch unit 10. Control unit A furthermore includes a switchable voltage controller 23. Ethernet physical layer circuit 21 is used to encode and decode the digital signals of microprocessor 20 into Ethernet bus signals.

It is now assumed that control unit A, switch unit 10 and components B through D are deactivated. Sensor 2 then detects a signal, i.e., it generates a signal for the purpose of activating voltage controller 23. At the same time, signal detector and generator 22 is activated, which changes its state and transmits a detectable signal. Microprocessor 20 is started up in parallel to the activation of signal detector and generator 22. Even before microprocessor 20 is started up, signal detector and generator 16 assigned to input and output EA/A detects the state change of signal detector and generator 22 and reads out the associated column for A from memory unit 17. Correspondingly, signal detectors and generators 16 assigned to inputs and outputs EA/B and EA/D are addressed by the read operation and subsequently change their state, which is detected by components B and D via their signal detectors and generators. In parallel to reading memory unit 17, switch 13 is activated via OR logic 18, and microprocessor 15 and switch 14 are started up. If control unit A now begins its communication, switch unit 10 and components B and D are already activated, so that the data connection between control unit A and the target component (B and D or another component connected to B or D) may be set up more rapidly.

The allocation rule in memory unit 17 may be static or configurable by microprocessor 15, which is indicated by the arrow. The system may also be designed to be self-learning, so that, for example, control units which are woken up but are not actually needed may report this and be removed from the matrix accordingly.

If a component to be woken up is erroneously not in the matrix, the data connection is set up using a step-by-step wakeup operation, it then being possible to enter the missing component into the matrix.

If control unit A is to be woken up, associated signal detector and generator 16 is correspondingly activated in switch unit 10. This state change is then detected by signal detector and generator 22, which is indicated by the dashed line in FIG. 2. Signal detector and generator 22 then activates voltage controller 23.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A switch unit for an Ethernet network, the switch unit comprising:
    a switch having at least three ports that are connected to inputs and outputs of the switch unit;
    a microprocessor;
    a signal detector and generator that is adapted to detect and initiate a bus activity and that is arranged between the at least three ports and the inputs and outputs of the switch unit; and
    a memory,
    wherein, for each input and output, an allocation rule to the other inputs and outputs of the switch unit is stored in the memory,
    wherein the switch unit is configured such that, when a bus activity is detected at the signal detector and generator, assigned inputs and outputs of an input and output of the signal detector and generator are read out from the memory so that the signal detector and generator generates a bus activity at the assigned inputs and outputs.

2. The switch unit according to claim 1, wherein the memory is configured by the microprocessor.

3. The switch unit according to claim 1, wherein the signal detector and generator and the memory are continuously supplied with voltage.

4. The switch unit according to claim 1, wherein a second switch is assigned to the switch and the microprocessor, which is adapted such that it is switched at least as a function of the signals at the signal detector and generator.

5. An Ethernet network comprising at least one switch unit that is connected to control units and/or additional switch units, the at least one switch unit comprising:
    a switch having a microprocessor, the switch having at least three ports that are connected to inputs and outputs of the at least one switch unit;
    a signal detector and generator adapted to detect and initiate a bus activity, the signal detector and generator being arranged between the at least three ports and the inputs and outputs of the at least one switch unit; and
    a memory, wherein, for each input and output, an allocation rule to the other inputs and outputs of the at least one switch unit is stored in the memory,
    wherein the at least one switch unit is configured such that, when a bus activity is detected at the signal detector and generator, assigned inputs and outputs of an input and output of the signal detector and generator are read out from the memory so that the signal detector and generator generates a bus activity at the assigned inputs and outputs.

6. The Ethernet network according to claim 5, wherein all switch units of the Ethernet network comprise at least one memory in which the allocation rule is stored.

7. The Ethernet network according to claim 5, wherein the at least one switch unit is configured such that all control units and/or switch units connected to the at least one switch unit are woken up in one operating mode.

8. The Ethernet network according to claim 5, wherein all switch units are configured such that a step-by-step wakeup operation is carried out in another operating mode.

9. A method for activating a component in the Ethernet network according to claim 5, the method comprising:
    detecting a bus activity of a control unit setting up a data connection in the at least one switch unit, the bus activity of the control unit being detected in the at least one switch unit via the signal detector and generator; and
    generating a bus activity at the assigned inputs and outputs so that the control units and/or switch units connected thereto are woken up.

10. The method according to claim 9, wherein the microprocessor is started up in parallel to a wakeup operation.

* * * * *